(12) United States Patent
McNeil et al.

(10) Patent No.: US 11,333,080 B2
(45) Date of Patent: May 17, 2022

(54) SYSTEM AND METHOD OF TRANSFERRING POWER IN A GAS TURBINE ENGINE

(71) Applicant: Rolls-Royce North American Technologies Inc., Indianapolis, IN (US)

(72) Inventors: Charles L. McNeil, Monrovia, IN (US); John Kusnierek, Springfield, OH (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 96 days.

(21) Appl. No.: 16/709,182

(22) Filed: Dec. 10, 2019

(65) Prior Publication Data

US 2020/0109669 A1 Apr. 9, 2020

Related U.S. Application Data

(62) Division of application No. 14/987,271, filed on Jan. 4, 2016.

(51) Int. Cl.
*F02C 9/20* (2006.01)
*F02K 3/02* (2006.01)
*F02C 3/04* (2006.01)
*F02C 3/113* (2006.01)

(52) U.S. Cl.
CPC .................. *F02C 9/20* (2013.01); *F02C 3/04* (2013.01); *F02C 3/113* (2013.01); *F02K 3/025* (2013.01); *F05D 2220/325* (2013.01)

(58) Field of Classification Search
CPC ............................. F01D 17/162; F02K 3/075
See application file for complete search history.

(56) References Cited

U.S. PATENT DOCUMENTS

| | | | | |
|---|---|---|---|---|
| 2,689,680 A * | 9/1954 | Alfred | ................... | F01D 17/162 415/26 |
| 4,791,783 A * | 12/1988 | Neitzel | ................. | F01D 17/162 60/226.3 |
| 5,402,638 A * | 4/1995 | Johnson | .................. | F02K 3/075 60/204 |
| 5,988,980 A * | 11/1999 | Busbey | .................... | F01D 5/225 416/193 R |
| 7,299,621 B2 * | 11/2007 | Bart | ........................ | F02C 3/067 60/226.1 |
| 7,730,714 B2 * | 6/2010 | Wood | .................... | F01D 17/162 60/226.1 |

(Continued)

*Primary Examiner* — Andrew H Nguyen
(74) *Attorney, Agent, or Firm* — Barnes & Thornburg LLP

(57) ABSTRACT

A method of extracting work from a convertible gas turbine engine having a core flowpath and a bypass flowpath. The method comprises operating the convertible gas turbine engine at a first volumetric flow rate through the core flowpath and a second volumetric flow rate through the bypass flowpath to produce a first work output of the convertible gas turbine engine; extracting the first work output via an unshrouded fan and a shaft at a first fan to shaft extraction ratio; altering the second volumetric flowrate through the bypass flowpath while maintaining the first work output; and extracting the first work output via an unshrouded fan and a shaft at a second fan to shaft extraction ratio.

4 Claims, 12 Drawing Sheets

(56) References Cited

U.S. PATENT DOCUMENTS

| | | | |
|---|---|---|---|
| 2007/0051091 A1* | 3/2007 | Rolt | F02K 3/06 60/226.1 |
| 2010/0154383 A1* | 6/2010 | Ress, Jr. | F02K 3/072 60/226.3 |
| 2015/0361819 A1* | 12/2015 | Epstein | F02K 3/075 415/1 |

* cited by examiner

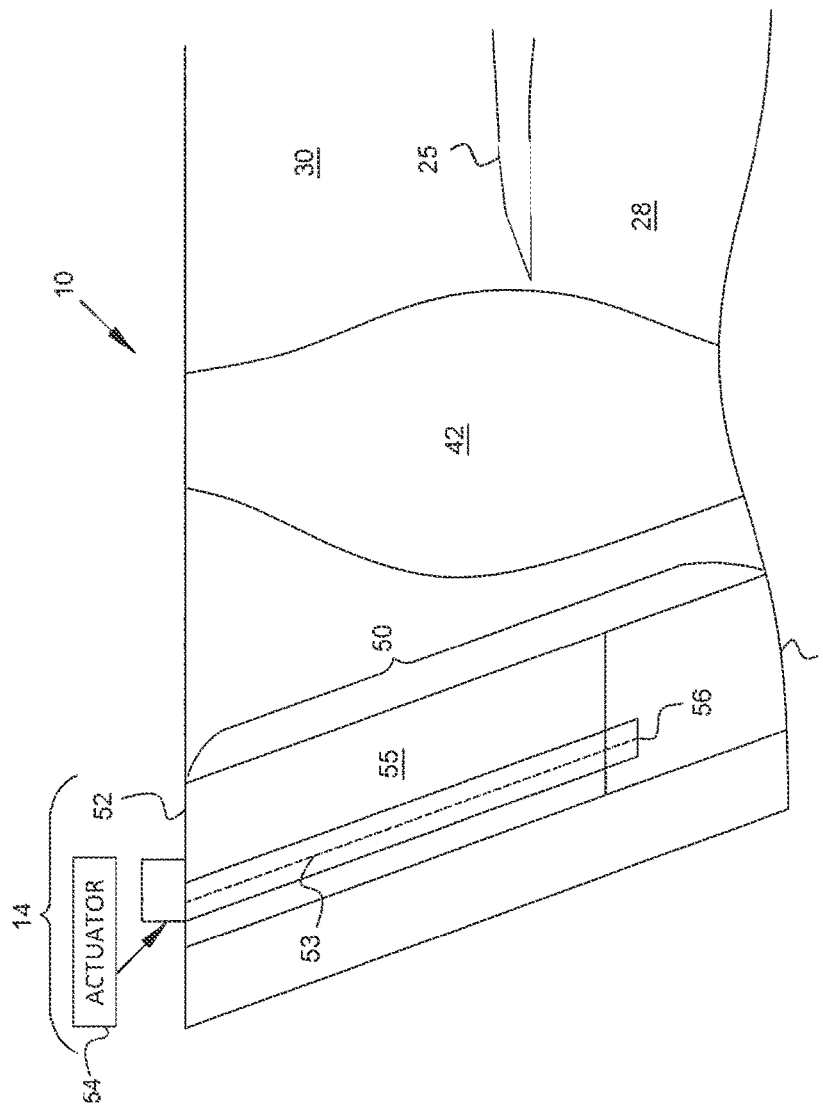
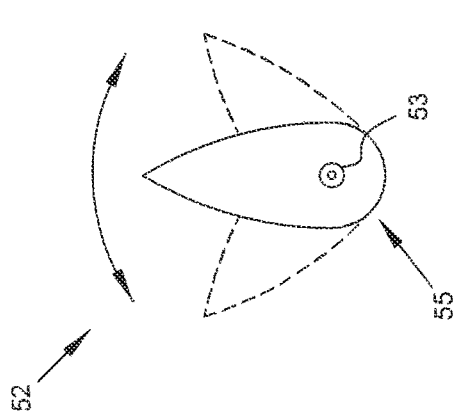
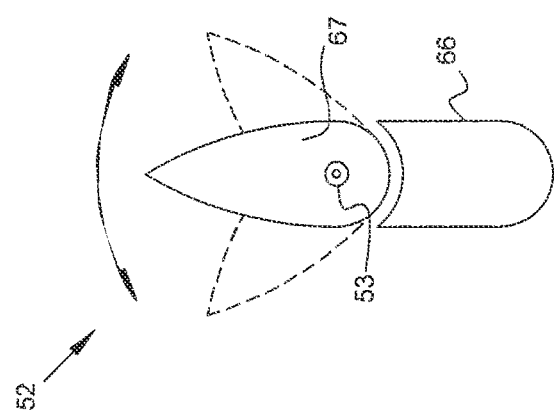

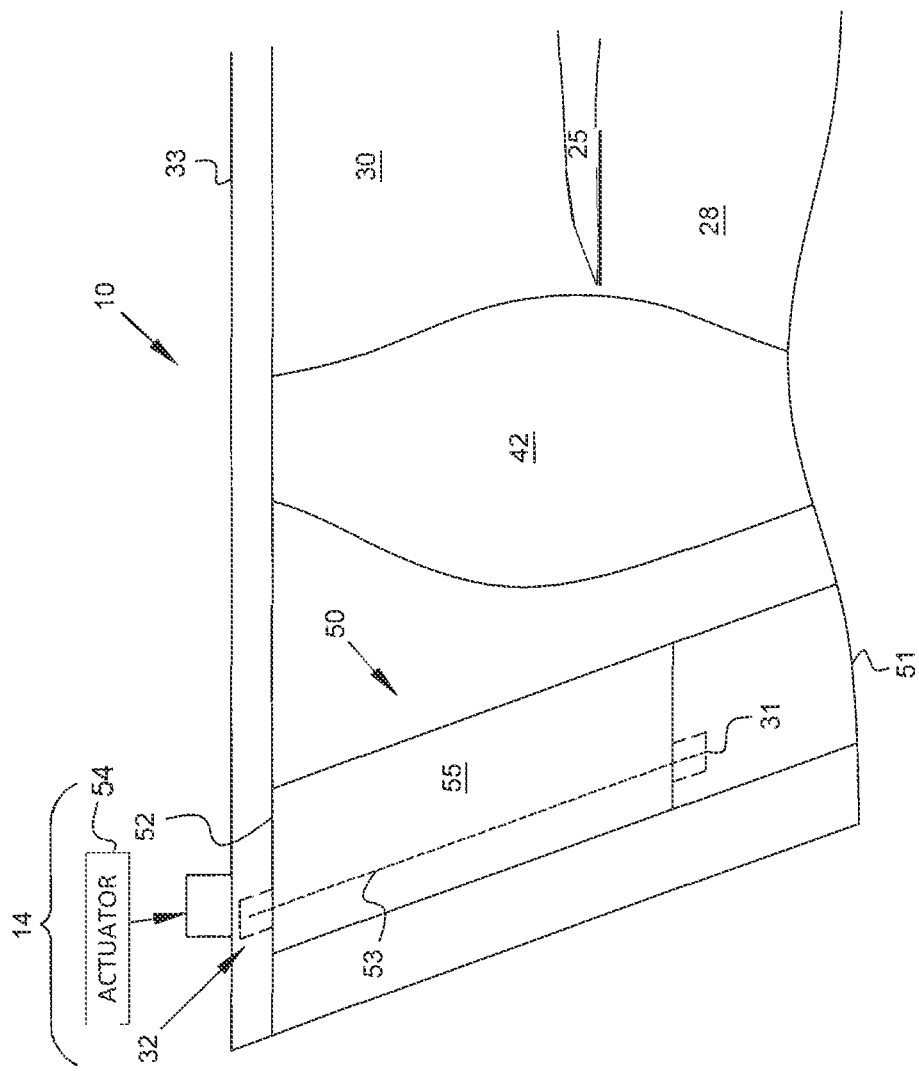

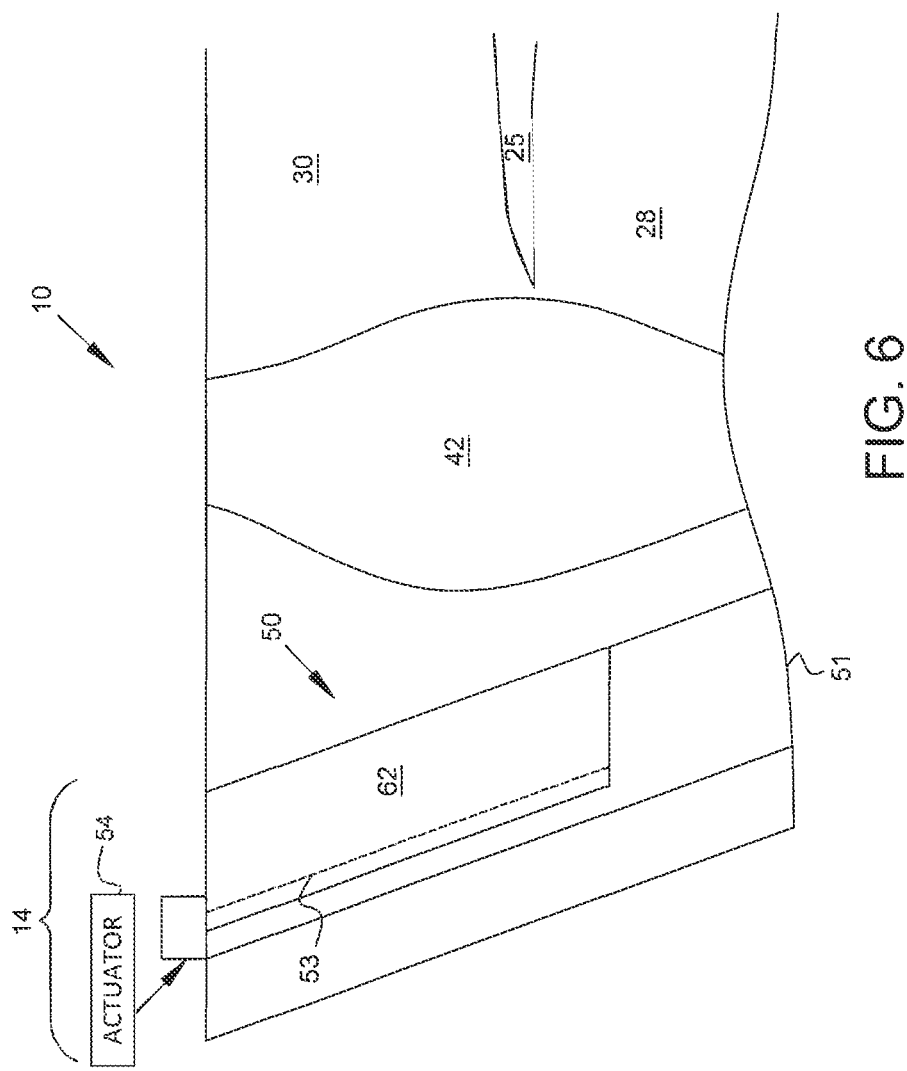

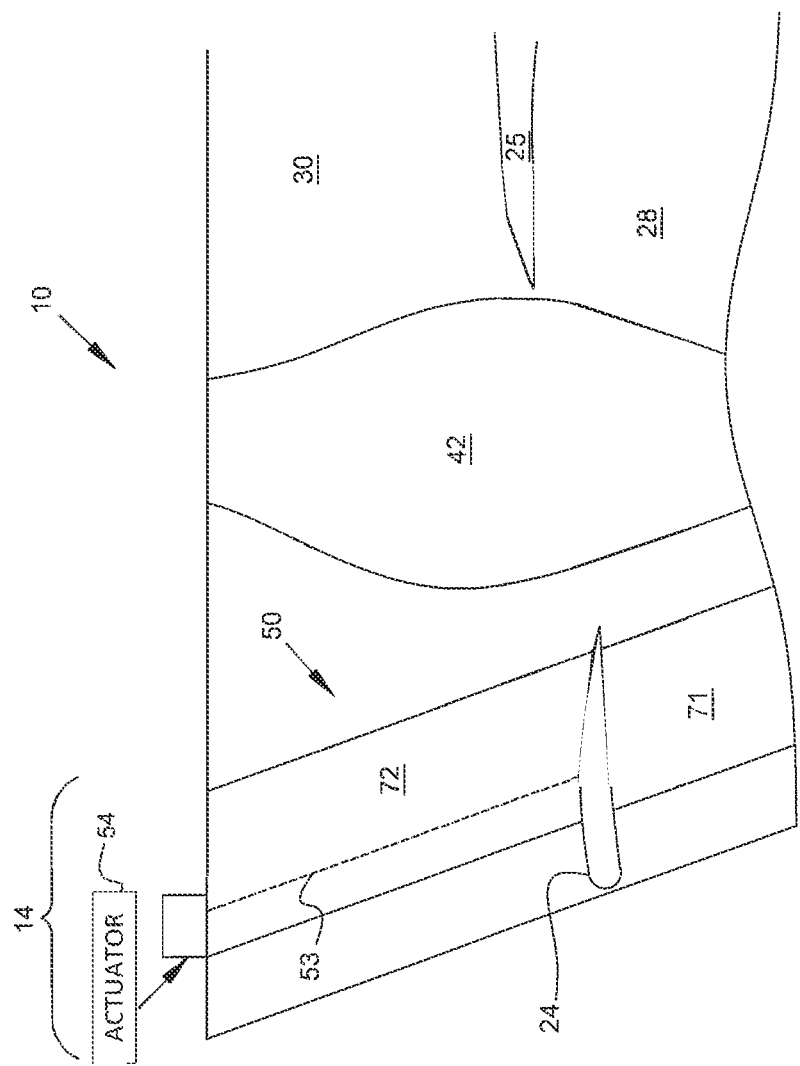

SYSTEM AND METHOD OF TRANSFERRING POWER IN A GAS TURBINE ENGINE

RELATED APPLICATIONS

This application is a divisional of U.S. Utility patent application Ser. No. 14/987,271, filed Jan. 4, 2016. This application is also related to co-pending applications U.S. patent application Ser. No. 14/837,190 entitled "Splayed Inlet Guide Vanes"; U.S. patent application Ser. No. 14/837,302 entitled "Morphing Vane"; U.S. patent application Ser. No. 14/837,557 entitled "Propulsive Force Vectoring"; U.S. patent application Ser. No. 14/837,942 entitled "A System and Method for a Fluidic Barrier on the Low Pressure Side of a Fan Blade"; U.S. patent application Ser. No. 14/837,079 entitled "Integrated Aircraft Propulsion System"; U.S. patent application Ser. No. 14/837,987 entitled "A System and Method for a Fluidic Barrier from the Upstream Splitter"; U.S. patent application Ser. No. 14/838,027 entitled "A System and Method for a Fluidic Barrier with Vortices from the Upstream Splitter"; U.S. patent application Ser. No. 14/838,067 entitled "A System and Method for a Fluidic Barrier from the Leading Edge of a Fan Blade"; U.S. patent application Ser. No. 14/838,093 entitled "Methods of Creating Fluidic Barriers in Turbine Engines"; U.S. patent application Ser. No. 14/837,031 entitled "Gas Turbine Engine having Radially-Split Inlet Guide Vanes". The entirety of these prior applications are incorporated herein by reference.

FIELD OF THE DISCLOSURE

The present disclosure generally relates to systems and methods used to transfer power. More specifically, the present disclosure is directed to systems and methods which use articulating vanes to effect a transfer of power in a gas turbine engine.

BACKGROUND

Fluid propulsion devices achieve thrust by imparting momentum to a fluid called the propellant. An air-breathing engine, as the name implies, uses the atmosphere for most of its propellant. The gas turbine produces high-temperature gas which may be used either to generate power for a propeller, fan, generator or other mechanical apparatus or to develop thrust directly by expansion and acceleration of the hot gas in a nozzle. In any case, an air breathing engine continuously draws air from the atmosphere, compresses it, adds energy in the form of heat, and then expands it in order to convert the added energy to shaft work or jet kinetic energy. Thus, in addition to acting as propellant, the air acts as the working fluid in a thermodynamic process in which a fraction of the energy is made available for propulsive purposes or work.

Typically turbofan engines include at least two air streams. All air utilized by the engine initially passes through a fan, and then it is split into the two air streams. The inner air stream is referred to as core air and passes into the compressor portion of the engine, where it is compressed. This core air then is fed to the combustor portion of the engine where it is mixed with fuel and the fuel is combusted. The combustion gases then are expanded through the turbine portion of the engine, which extracts energy from the hot combustion gases, the extracted energy being used to run the compressor, the fan and other accessory systems. The remaining hot gases then flow into the exhaust portion of the engine, which may be used to produce thrust for forward motion to the aircraft.

The outer air flow stream bypasses the engine core and is pressurized by the fan. Typically, no other work is done on the outer air flow stream which continues axially down the engine but outside the core. The bypass air flow stream also can be used to accomplish aircraft cooling by the introduction of heat exchangers in the fan stream. Downstream of the turbine, the outer air flow stream is used to cool engine hardware in the exhaust system. When additional thrust is required (demanded), some of the fan bypass air flow stream may be redirected to the augmenter (afterburner) where it is mixed with core flow and fuel to provide the additional thrust to move the aircraft, in some applications Many current and most future aircraft need efficient installed propulsion system performance capabilities at diverse flight conditions and over widely varying power settings for a variety of missions. Current turbofan engines are limited in their capabilities to supply this type of mission adaptive performance, in great part due to the fundamental operating characteristics of their core systems which has limited flexibility in load shifting between shaft and fan loading.

When defining a conventional engine cycle and configuration for a mixed mission application such as a mixed turbofan and turboshaft application, compromises have to be made in the selection of fan pressure ratio, bypass ratio, and overall pressure ratio to allow a reasonably sized engine to operate effectively. In particular, the fan pressure ratio and related bypass ratio selection needed to obtain a reasonably sized engine capable of developing the thrusts needed for combat maneuvers are non-optimum for efficient low power flight where a significant portion of the engine output is transmitted to the shaft. In some applications, it is desired to reduce engine thrust in order to transfer more power to a shaft which drives a lift rotor, propeller, generator, or other device or system external to the turbofan engine.

Referring to the drawings wherein identical reference numerals denote the same elements throughout the various views, FIG. 1A shows a general orientation of a turbofan engine in a cut away view. In the turbofan engine shown the flow of the air is generally axial. The engine direction along the axis is generally defined using, the terms "upstream" and "downstream" generally which refer to a position in a jet engine in relation to the ambient air inlet and the engine exhaust at the back of the engine. For example, the inlet fan is upstream of the combustion chamber. Likewise, the terms "fore" and "aft" generally refer to a position in relation to the ambient air inlet and the engine exhaust nozzle. Additionally, outward/outboard and inward/inboard refer to the radial direction. For example the bypass duct is outboard the core duct. The ducts are generally circular and co-axial with each other.

As ambient inlet airflow 12 enters inlet fan duct 14 of turbofan engine 10, through the guide vanes 15 and passes by fan spinner 16, through fan rotor (fan blade) 42. The airflow 12 is split into primary (core) flow stream 28 and bypass flow stream 30 by upstream splitter 24 and downstream splitter 25. In FIG. 2, the bypass flow stream 30 along with the core/primary flow stream 28 is shown, the bypass stream 30 being outboard of the core stream 28. The inward portion of the bypass steam 30 and the outward portion of the core streams are partially defined by the splitters upstream of the compressor 26. The fan 42 has a plurality of fan blades.

As shown in FIGS. 1A and 1B the fan blade 42 shown is rotating about the engine axis into the page, therefor the low pressure side of the blade 42 is shown, the high pressure side being on the opposite side. The primary flow stream 28 flows through compressor 26 that compresses the air to a higher pressure. The compressed air typically passes through an outlet guide vane to straighten the airflow and eliminate swirling motion or turbulence, a diffuser where air spreads out, and a compressor manifold to distribute the air in a smooth flow. The core flow stream 28 is then mixed with fuel in combustion chamber 36 and the mixture is ignited and burned. The resultant combustion products flow through turbines 38 that extract energy from the combustion gases to turn fan rotor 42, compressor 26 and any shaft work by way of turbine shaft 40. The gases, passing exhaust cone, expand through an exhaust nozzle 43 to produce thrust. Primary flow stream 28 leaves the engine at a higher velocity than when it entered. Bypass flow stream 30 flows through fan rotor 42, flows by bypass duct outer wall 27, an annular duct concentric with the core engine, flows through fan discharge outlet and is expanded through an exhaust nozzle to produce additional thrust. Turbofan engine 10 has a generally longitudinally extending centerline represented by engine axis 46.

A typical turbofan engine employs a two-shaft design, with a high-pressure turbine and the compressor 26 connected via a first shaft and a low-pressure turbine and the fan blade 42 connected via a second shaft. In most designs the first and second shafts are concentrically located.

In most turbofan engines a significant portion of the engine's thrust is produced by the rotation of fan blades 42 to create airflow in the bypass stream 30. However, as noted above in some applications it is desirable to reduce an engine's thrust in order to transfer power to other systems, devices, or applications. Thus, an effective means is needed to reduce a turbofan engine's thrust while maintaining overall power produced by the core.

These and many other advantages of the present subject matter will be readily apparent to one skilled in the art to which the invention pertains from a perusal of the claims, the appended drawings, and the following detailed description of preferred embodiments.

The present application discloses one or more of the features recited in the appended claims and/or the following features which, alone or in any combination, may comprise patentable subject matter.

BRIEF DESCRIPTION OF THE DRAWINGS

The following will be apparent from elements of the figures, which are provided for illustrative purposes and are not necessarily to scale.

FIGS. 3A and 3B are cutaway perspective views of a turbofan engine with a radially-split inlet guide vane in accordance with some embodiments of the present disclosure.

FIG. 4 is a profile view of a variable portion of a radially-split inlet guide vane in accordance with some embodiments of the present disclosure.

FIG. 5 is a profile view of a variable portion of a radially-split inlet guide vane in accordance with some embodiments of the present disclosure.

FIG. 6 is a cutaway perspective view of a turbofan engine with a radially-split inlet guide vane in accordance with some embodiments of the present disclosure.

FIG. 7 is a cutaway perspective view of a turbofan engine with a radially-split inlet guide vane in accordance with some embodiments of the present disclosure.

Figure 1A:
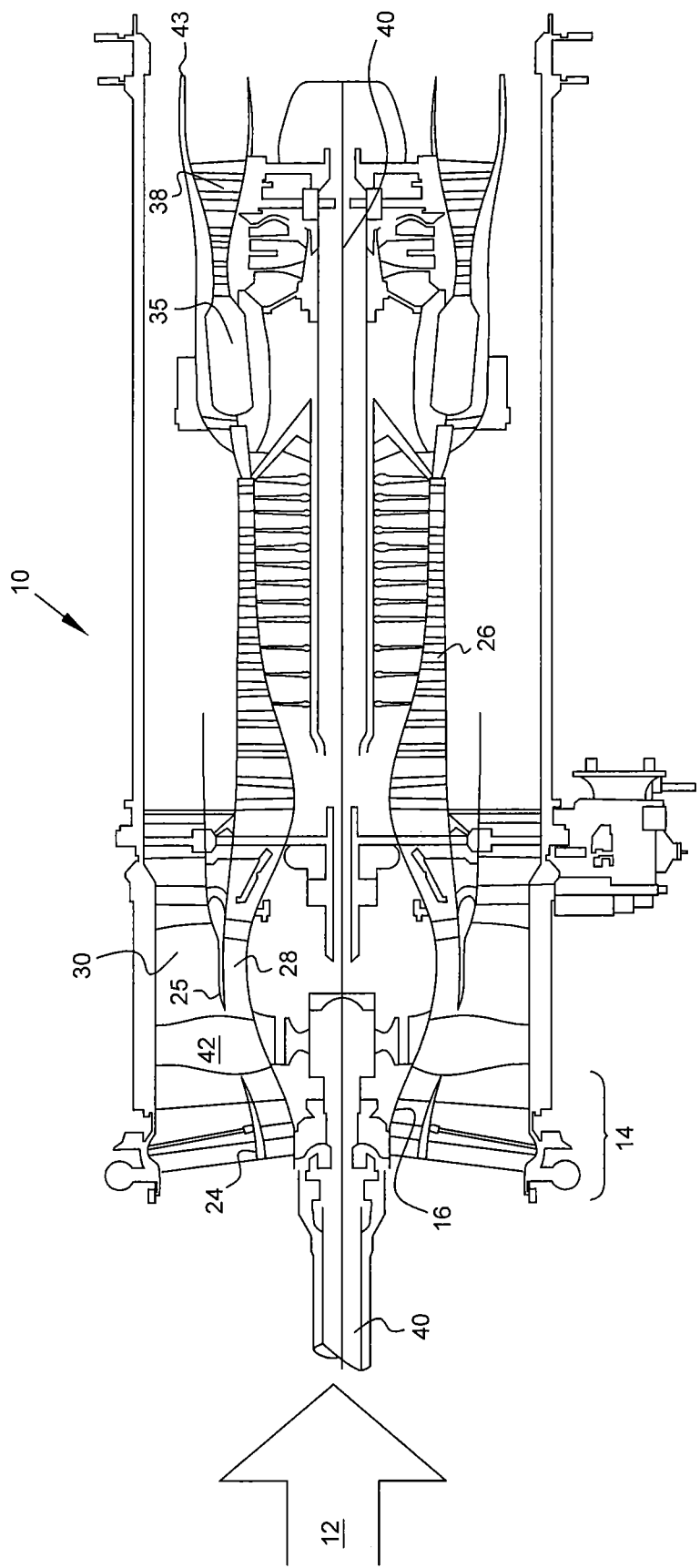
FIGS. 1A and 1B are cutaway perspective views of typical turbofan engines.
Figure 1B:
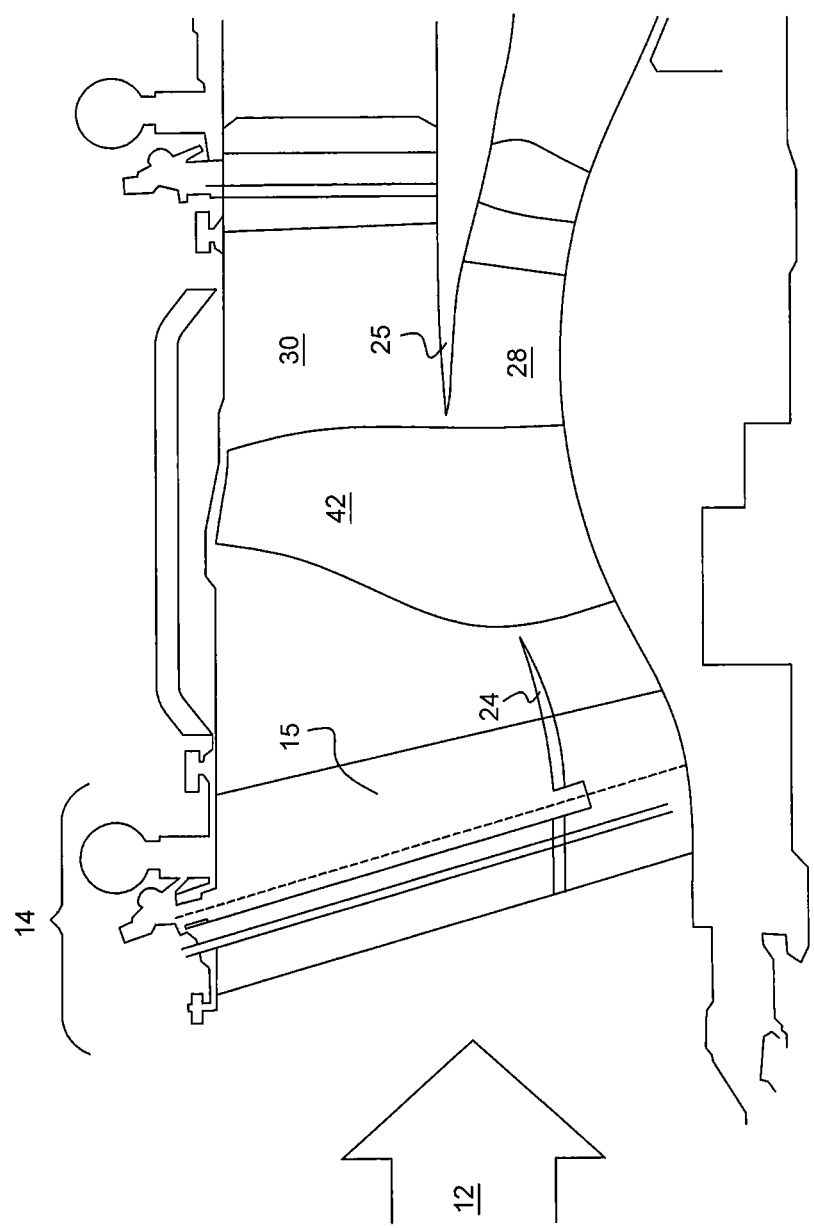
Figure 2:
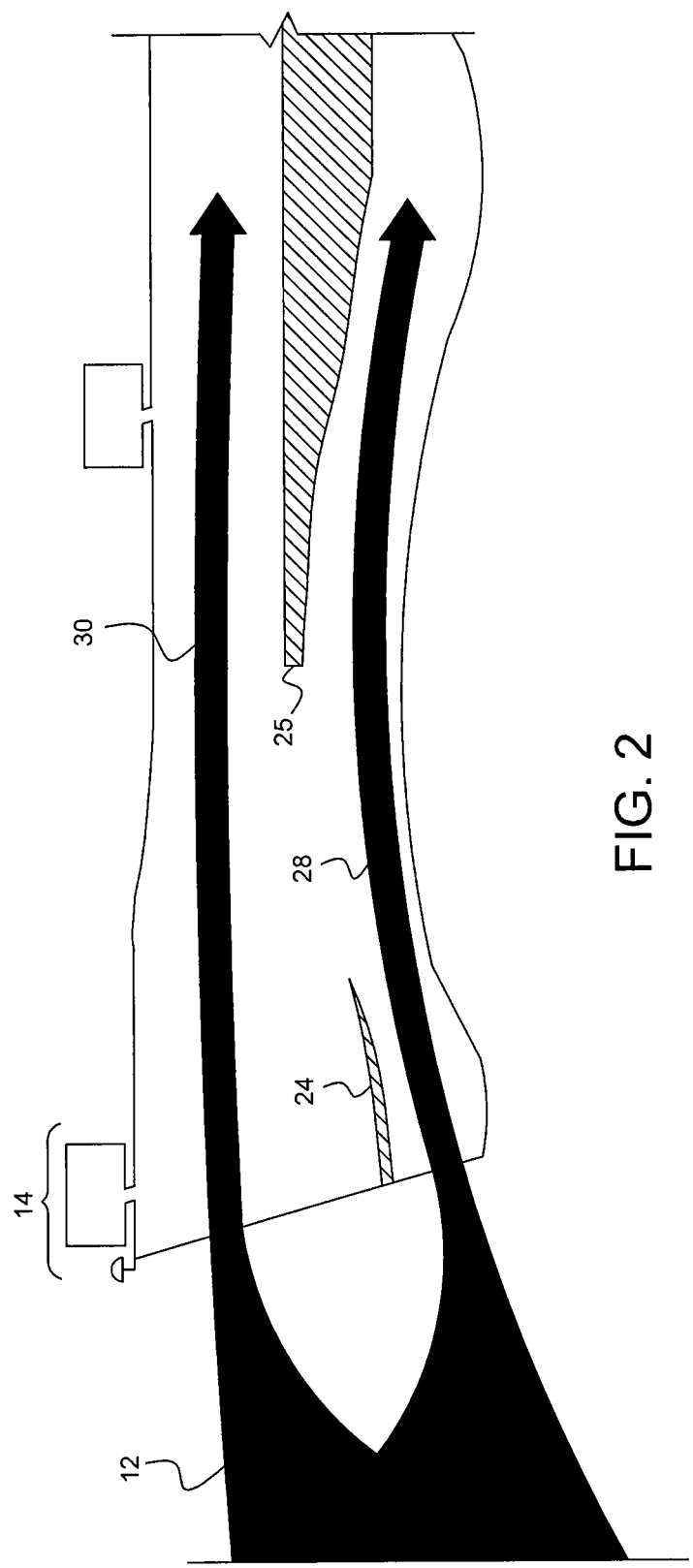
FIG. 2 is an illustration of the bypass and core airflow paths in a typical turbofan engine.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

This disclosure presents embodiments to overcome the aforementioned deficiencies of conventional turbofan engines. More specifically, this disclosure is directed to systems and methods of transferring power or maintaining a desired distribution between turboshaft and turbofan modes of operation in a gas turbine engine. In a method, air is admitted to the core flowpath and bypass flowpath to establish a first work output of a gas turbine engine. While maintaining core operating conditions constant, the flow rate of air to the bypass flowpath is altered to transfer work between the shaft and the fan. First work output is maintained constant while work distribution is altered.

In some embodiments, the disclosed methods are executed in a gas turbine engine having an air inlet comprising a plurality of radially-split inlet guide vanes having a first fixed portion to control airflow into the engine core and a second variable portion to control airflow into the engine bypass. In some embodiments, the disclosed methods are executed in a gas turbine engine having an air inlet comprising a plurality of radially-split inlet guide vanes having a first variable portion to control airflow into the engine core and a second variable portion to control airflow into the engine bypass. In some embodiments, the disclosed methods are executed in a gas turbine engine having a plurality of radially-split exit guide vanes having a first portion to control airflow into the engine core and a second portion to control airflow into the engine bypass, where first portion and second portion are either fixed or variable.

The disclosed method thus enables a turbofan engine to significantly reduce its thrust output by reducing bypass airflow while maintaining a constant overall engine power output by maintaining a constant volume of core airflow. Engine power can be transferred from thrust to other applications such as a lift fan, propeller, generator, or other device or system.

FIG. 3A is a cutaway perspective view of a turbofan engine 10 having a radially-split inlet guide vane 50. As described above, turbofan engine 10 has an inlet fan duct 14 leading to a fan blade 42. A downstream splitter 25 divides air entering the turbofan engine 10 into a core flow stream 28 and a bypass flow stream 30. A single radially-split inlet guide vane 50 is illustrated; a plurality of such vanes 50 are arranged circumferentially around the centerline axis for directing and controlling airflow entering turbofan engine 10.

Each vane 50 comprises a pair of lateral major surfaces forming a leading and a trailing edge. As illustrated in FIG. 3A, in some embodiments a radially-split inlet guide vane 50 comprises a first portion 51 and second portion 52. In some embodiments the first portion 51 is disposed radially inward from the second portion 52. The first portion 51 directs air onto fan blade 42 and then into core flow stream 28. In some embodiments the first portion 51 comprises a fixed blade. The second portion 52 is disposed radially outward from the first portion 51, and directs air onto fan blade 42 and then into bypass flow stream 30.

In some embodiments fan blade 42 is one of a plurality of fan blades comprising a single-stage adaptive fan which is operated in conjunction with fixed or variable inlet or exit guide vanes which load or unload the fan. When the fan utilizes the majority of the work output of the gas turbine engine then the engine is said to operate in turbofan mode, whereas when the majority of work output is driving the shaft the engine is said to operate in turboshaft mode.

FIG. 3A additionally illustrates an actuator 54 connected to second portion 52. The actuator 54 is adapted to vary the position of second portion 52, thus altering the geometry of the inlet fan duct 14. In some embodiments a stem 56 extends from its connection with the actuator 54 through second portion 52 and into first portion 51, thus providing two articulating points for second portion 52. Stem 56 may provide the axis of articulation 53, which may be located at the aerodynamic center of second portion 52 or may be located offset from the aerodynamic center. In some embodiments the actuator 54 is an actuation ring disposed transverse to the direction of airflow 12 and radially outward from vane 50. An actuation ring is connected to each second portion 52 of the plurality of radially-split inlet guide vanes 50 such that movement of the actuation ring causes articulation of each second portion 52.

FIG. 3B illustrates a second embodiment of radially-split inlet guide vane 50 having a lower protrusion 31 extending from second portion 52 into first portion 51 and an upper protrusion 32 extending from second portion 52 into a turbine casing 33. Upper protrusion 32 and lower protrusion 31 provide articulating points for second portion 52. An axis of articulation 53 is defined through upper protrusion 32 and lower protrusion 32. Actuator 54 is connected to second portion 52 via upper protrusion 32. In some embodiments either upper protrusion 32 or lower protrusion 31 is omitted and second portion 52 has a single point of articulation.

In some embodiments such as those illustrated in FIGS. 3A and 3B second portion 52 comprises a unitary member 55 which rotates about an axis of articulation 53. FIG. 4 is a profile view of such a second portion 52, illustrating the range of motion of a unitary member 55.

In some embodiments such as those illustrated in FIGS. 3A and 3B second portion 52 can comprise a fixed strut 66 and a rotatable flap 67. FIG. 5 is a profile view of one such embodiment which illustrates the range of motion of rotatable flap 67. As shown in FIG. 5, fixed strut 66 is disposed upstream from rotatable flap 67, which articulates about axis of articulation 53.

FIG. 6 is a cutaway perspective view of a turbofan engine 10 having a radially-split inlet guide vane 50 of a different configuration than that illustrated in FIG. 3. Specifically, in FIG. 6 the radially-split inlet guide van 50 comprises a unitary fixed portion 61 and a variable portion 62. The fixed portion 61 extends radially across the inlet fan duct 14, providing a fixed vane upstream from core flow stream 28 and the fixed strut portion of the variable van upstream from bypass flow stream 30. Variable portion 62 is connected to actuator 54 and articulates about an axis of articulation 53. In profile view, vane 50 illustrated in FIG. 6 would appear similar to the second portion 52 illustrated in FIG. 5, having a fixed strut (the fixed portion 61) and rotatable flap (the variable portion 62).

FIG. 7 is a cutaway perspective view of a turbofan engine 10 having a radially-split inlet guide vane 50 of a different configuration than that illustrated in FIG. 3. Specifically, in FIG. 7 the radially-split inlet guide vane 50 comprises a first portion 71 and second portion 72 which are separated by an integral upstream splitter 24. As with previous embodiments, first portion 71 is radially inward from second portion 72 and is fixed. Second portion 72 is variable. In some embodiments second portion 72 is a unitary airfoil which rotates about an axis of articulation 53, while in other embodiments second portion 72 comprises a fixed strut and rotatable flap. Upstream splitter 24 assists the radially-split inlet guide vane 50 and downstream splitter 25 in dividing inlet air into a bypass flow stream 30 and core flow stream 28.

Figure 8:
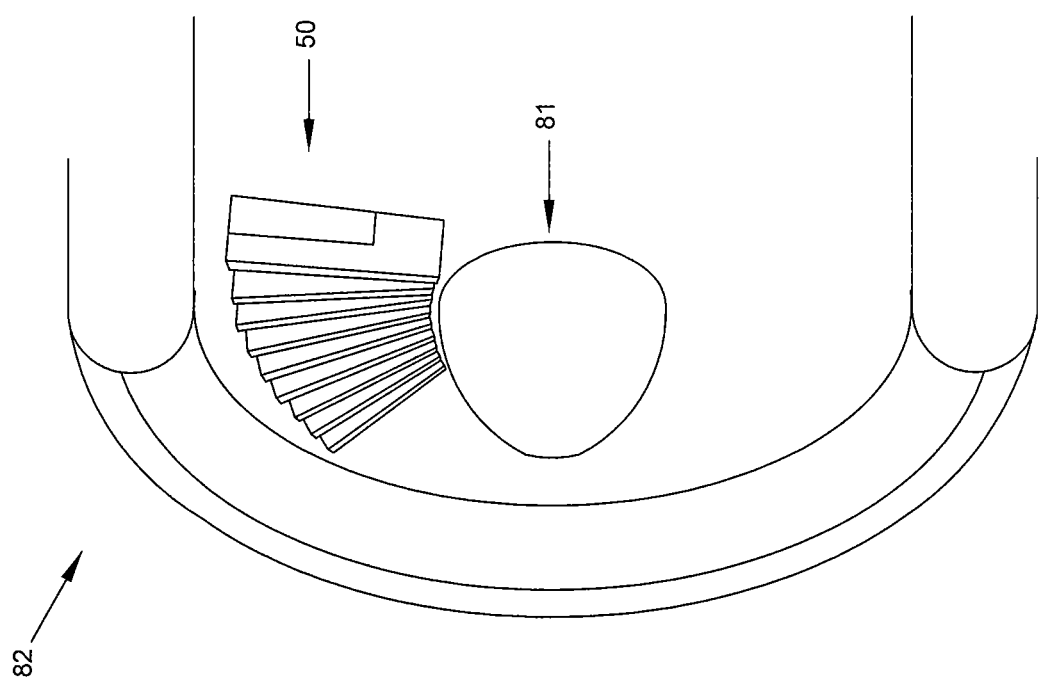
FIG. 8 is an isometric view of turbofan engine having radially-split inlet guide vanes in accordance with some embodiments of the present disclosure.
Figure 9:
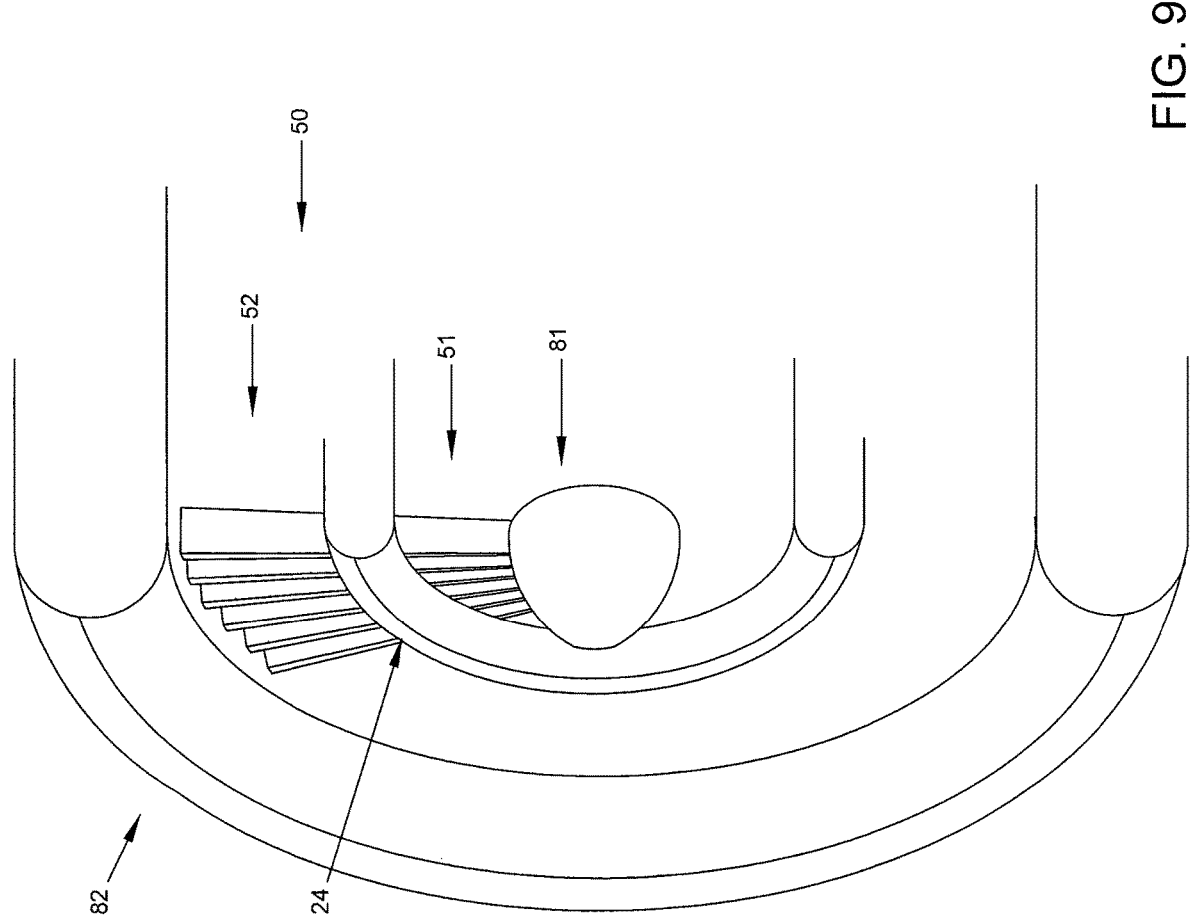
FIG. 9 is an isometric view of turbofan engine having radially-split inlet guide vanes in accordance with some embodiments of the present disclosure.

FIGS. 8 and 9 are isometric views of a turbofan engine 10 having a plurality of radially-split inlet guide vanes 50. As both FIG. 8 and FIG. 9 show, a plurality of radially-split inlet guide vanes 50 extend radially outward from a centerline axis 81 and are radially contained by nacelle 82. FIG. 8 illustrates radially-split inlet guide vanes 50 independent of an upstream splitter 24 and having fixed and variable portions configured as illustrated in FIG. 6. FIG. 9 illustrates radially-split inlet guide vanes 50 integral to an upstream splitter 24 and having a fixed first portion 51 and variable second portion 52 as illustrated in FIG. 7.

Figure 10:
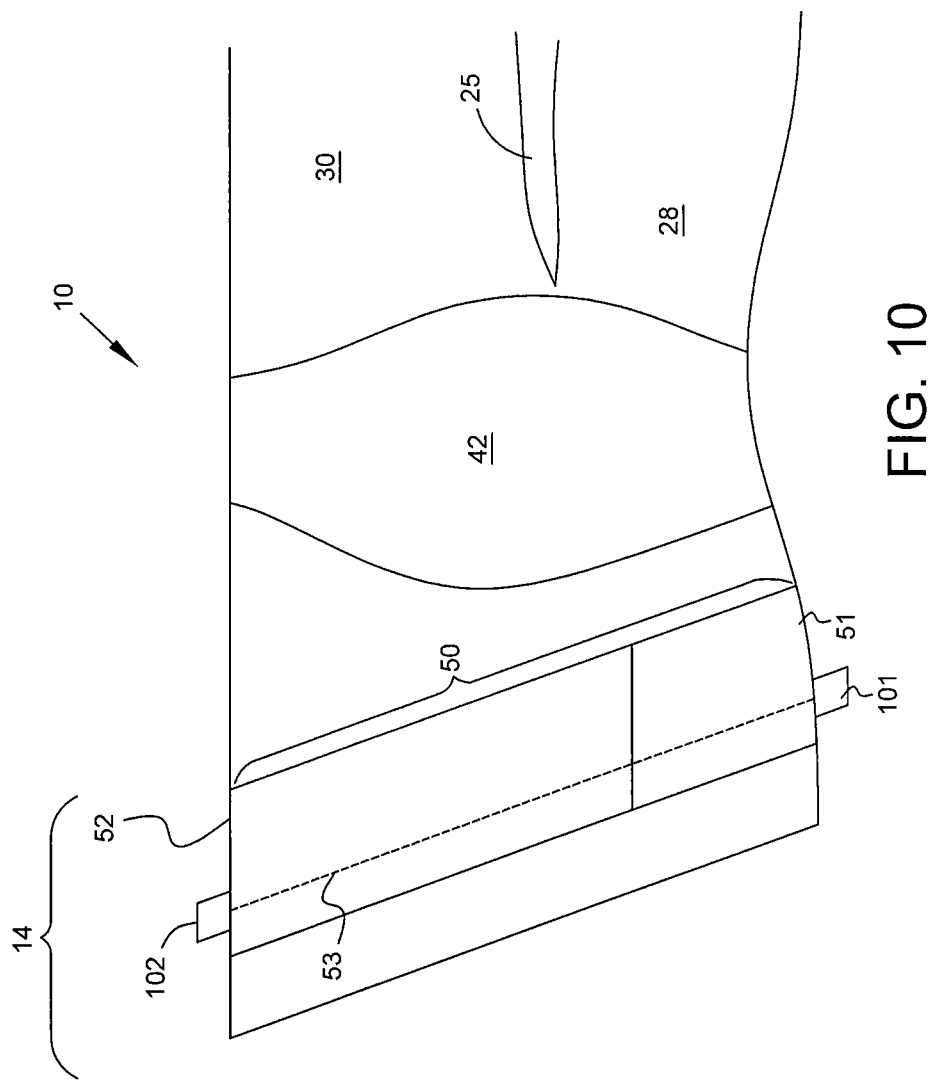
FIG. 10 is a cutaway perspective view of a turbofan engine having a radially-split inlet guide vane in accordance with some embodiments of the present disclosure.

FIG. 10 is a cutaway perspective view of a turbofan engine 10 having a radially-split inlet guide vane 50. A single radially-split inlet guide vane 50 is illustrated; a plurality of such vanes 50 are arranged circumferentially around the centerline axis for directing and controlling airflow entering turbofan engine 10.

As in the embodiment illustrated in FIG. 3A, the embodiment illustrated in FIG. 10 shows a radially-split inlet guide vane 50 comprising a first portion 51 and second portion 52. Unlike the embodiment of FIG. 3A however, both first portion 51 and second portion 52 are variable portions. The first portion 51 directs air onto fan blade 42 and then into core flow stream 28. The second portion 52 is disposed radially outward from the first portion 51, and directs air onto fan blade 42 and then into bypass flow stream 30.

FIG. 10 illustrates a first portion actuator 101 connected to first portion 51 and a second portion actuator 102 connected to second portion 52. Each actuator 101, 102 is adapted to vary the position of its respective portion 51, 52, thus altering the geometry of the inlet fan duct 14. Variable first portion 51 and second portion 52 articulate about an axis of articulation 53, which is illustrated as an axis common to both first portion 51 and second portion 52 in FIG. 10. In some embodiments, first portion 51 has a different axis of articulation from second portion 52. In some embodiments a stem (not shown) extends through one or more of first portion 51 and second portion 52 to enable articulation of the respective portion. In some embodiments the stem is connected to an actuator such as first portion actuator 101 or second portion actuator 102.

Figure 11:
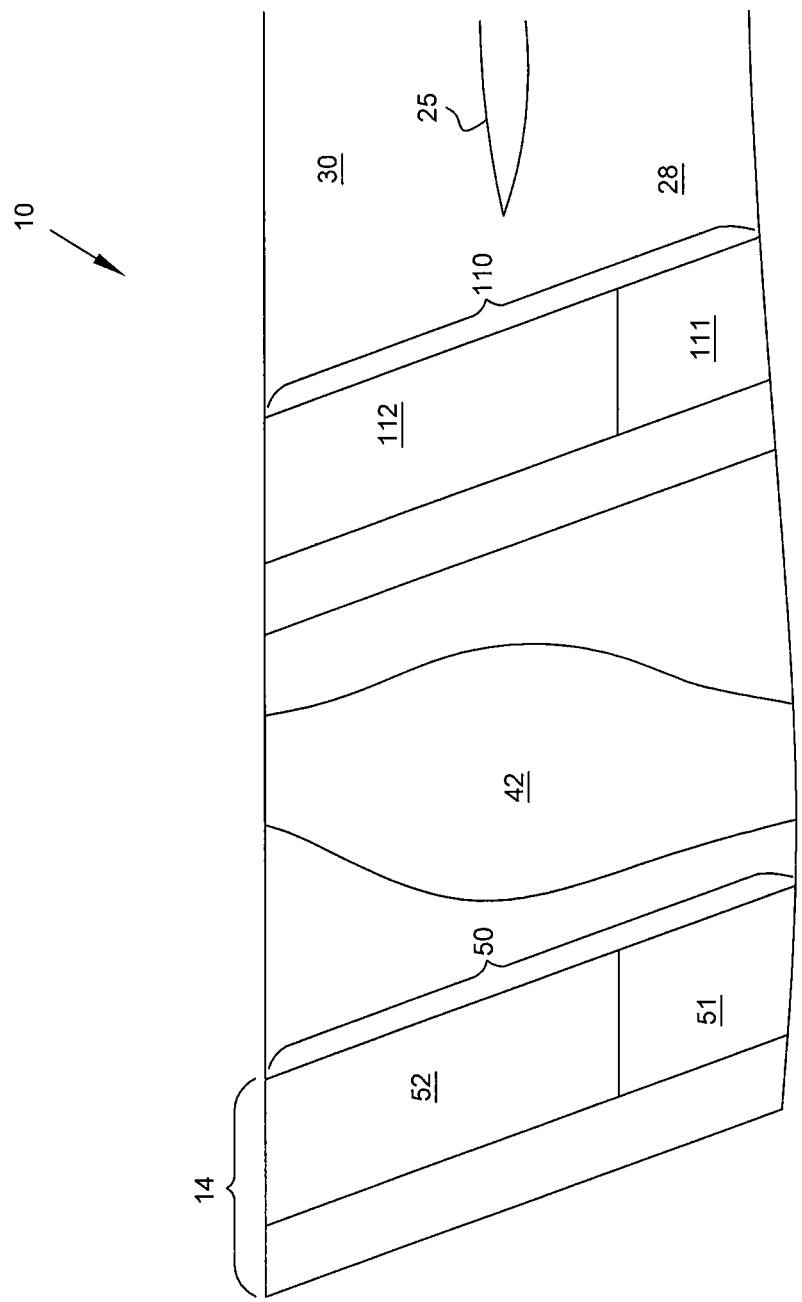
FIG. 11 is a cutaway perspective view of a turbofan engine having a radially-split inlet guide vane forward of fan blade and a radially-split exit guide vane in accordance with some embodiments of the present disclosure.

FIG. 11 is a cutaway perspective view of a turbofan engine 10 having a radially-split inlet guide vane 50 forward of fan blade 42 and a radially-split exit guide vane 110. Radially-split exit guide vane 110 comprises a first exit guide vane portion 111 and a second exit guide vane portion 112, which can each be either fixed or variable. In some embodiments, first exit guide vane portion 111 and a second exit guide vane portion 112 are operated in conjunction with first portion 51 and second portion 52 to control airflow into the bypass stream 30 and core stream 28.

In some embodiments, core and bypass streams are split across the fan blade as described in U.S. patent application Ser. Nos. 14/837,942; 14/837,987; 14/838,027; 14/838,067; and 14/838,093 which are herein incorporated by reference.

Figure 12:
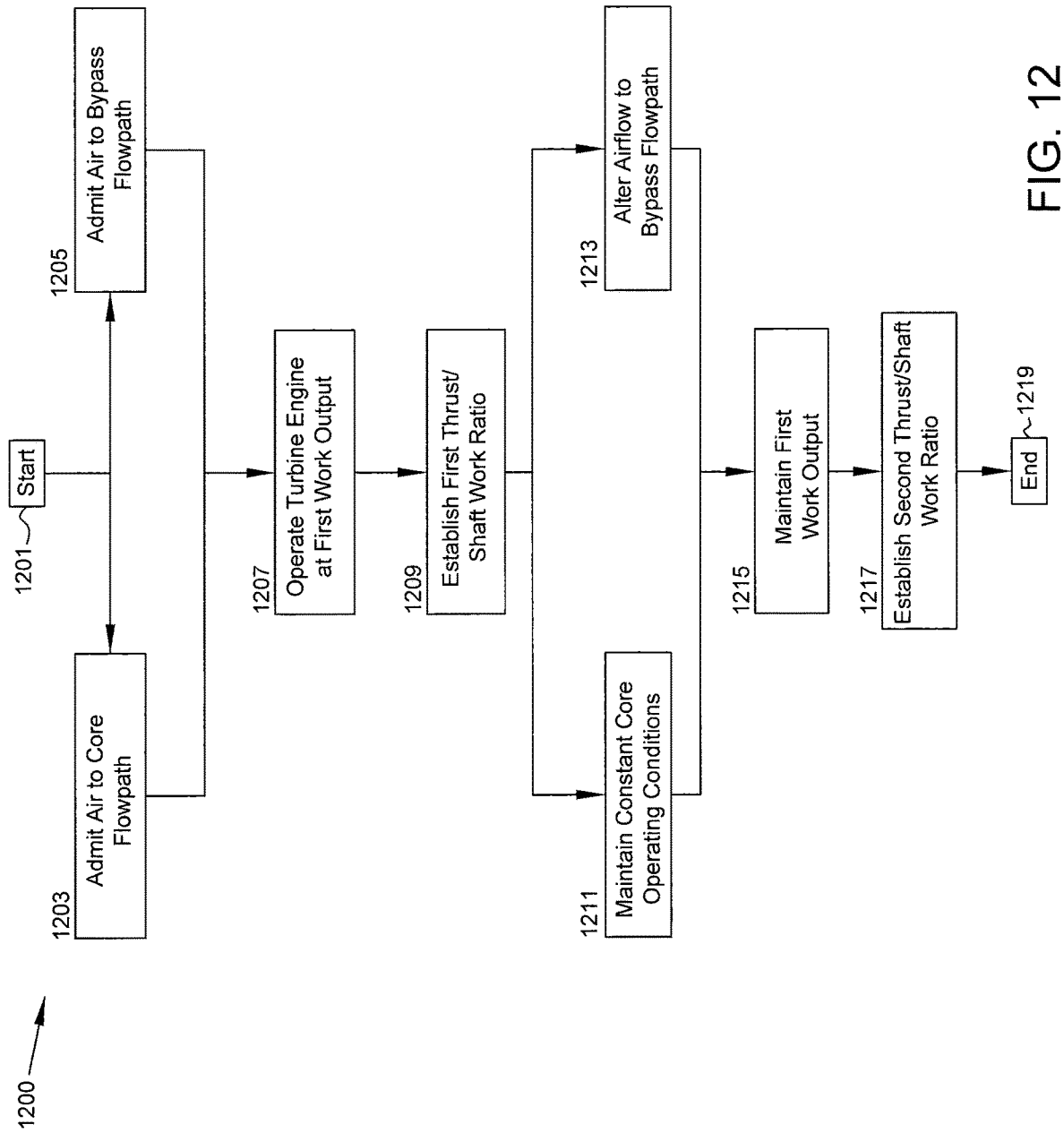
FIG. 12 is a flow diagram of a method of transferring power between turboshaft and turbofan operations in accordance with some embodiments of the present disclosure.

FIG. 12 is a flow diagram of a method 1200 of transferring power between turboshaft and turbofan operations, and vice versa. The method 1200 begins at step 1201 and proceeds simultaneously to steps 1203 and 1205. At step 1203 air is admitted into the core flowpath. In some embodiments, airflow to the core flowpath is controlled via an inward portion of radially-split inlet guide vanes and/or radially-split exit guide vanes. In some embodiments the inward portion of radially-split inlet guide vanes and/or radially-split exit guide vanes is variable, while in other embodiments the inward portion is fixed. Air is admitted into the core flowpath at a first volumetric flow rate.

At step 1205 air is admitted into the bypass flowpath. In some embodiments, airflow to the core flowpath is controlled via an outward portion of radially-split inlet guide vanes and/or radially-split exit guide vanes. In some embodiments the outward portion of radially-split inlet guide vanes and/or radially-split exit guide vanes is variable, while in other embodiments the outward portion is fixed. Air can be admitted into the bypass flowpath at a second volumetric flow rate, which may or may not be the same as the first volumetric flow rate.

Method 1200 then proceeds to step 1207, where the gas turbine engine is operated at a first work output which is partially based on airflow through the core flowpath. At step 1209, a first distribution between thrust and shaft power (a thrust/shaft work ratio) is established in the operating gas turbine engine. This first distribution can include full thrust (zero shaft power), full shaft power (minimum thrust), or a continuous range between full thrust and full shaft power in which the work output of the engine is distributed between thrust and shaft power. In embodiments having variable outward portions of radially-split inlet guide vanes, the position of the variable portion can thus be described as a full thrust position in which the variable portion provides maximum air flow to the bypass flowpath, a full shaft power position in which the variable portion is shut or partially shut to secure air flow or significantly reduce air flow to the bypass flowpath, and a continuous range of positions between full thrust and full shaft power. In some embodiments the shaft of the gas turbine engine is connected to a lift fan, a propeller, a generator, or other device or system which requires or receives shaft power.

Method 1200 then proceeds simultaneously to steps 1211 and 1213. At step 1211 the flow rate of air admitted to the core flowpath is maintained constant, as are other core operating conditions. At step 1213 the flow rate of air admitted into the bypass flowpath is altered. In some embodiments, the flow rate to the bypass flowpath is altered by adjusting the variable portion of radially-split inlet guide vanes or radially-split exit guide vanes. In some embodiments, the position of the variable portion is adjusted by articulating a unitary airfoil around an axis of articulation. In other embodiments, a variable portion comprises a fixed strut and rotatable flap which is articulated around an axis of articulation. In some embodiments, an actuator or actuation ring is used to adjust the position of the variable portion.

As an example, step 1213 could comprise articulating a unitary airfoil to reduce the effective surface area of inlet fan duct 14, resulting in less intake of inlet air into the bypass flowpath and subsequently in less thrust output from the gas turbine engine. Further, in some embodiments step 1213 comprises a first sub-step of coarsely adjusting the flow rate of air admitted into the bypass flowpath by making a first relatively larger change in the position of the variable portion, followed by a second sub-step of finely adjusting the flow rate of air admitted into the bypass flowpath by making a second relatively smaller change in the position of the variable portion.

At step 1215 first work output of the gas turbine engine is maintained constant. At step 1217 a second thrust/shaft work ratio is established. The engine is operated at a second distribution between thrust and shaft power. This second distribution can include full thrust (zero shaft power), full shaft power (minimum thrust), or a continuous range between full thrust and full shaft power in which the power output of the engine is distributed between thrust and shaft power.

Method 1200 ends at step 1219.

The disclosed systems and methods provide numerous advantages over the prior art. In applications requiring a gas turbine engine to operate in both turbofan mode (producing thrust) and turboshaft mode (producing shaft power), the disclosed systems and methods allows for transitioning between these modes or balancing operation simultaneously between these two modes. A single engine is thus capable of providing turboshaft power to a rotorcraft, turboprop, generator, or similar shaft-powered device and then, without modifying operating conditions of the core engine, converts seamlessly and continuously to a high thrust turbofan while decreasing shaft extraction. Thrust can be significantly altered in a near-instantaneous manner and the engine can make a rapid transition between turboshaft and turbofan modes of operation. In fact, the changes in thrust achieved by the disclosed method are more rapid than would be achievable using mechanical clutches between the turbine and the fan unit, and present advantages in applications requiring such rapid changes in thrust, for example during a rapid egress of a military aircraft.

The disclosed systems and methods can be integrated into gas turbine engine designs which use a single stage fan or a two-stage fan, and which use any number of engine shafts. A further advantage is that fan blades of the turbofan engine are not required to be shrouded, segmented, or otherwise include devices which physically separate airflow into core and bypass flows. The use of unshrouded fan blades results in a simpler design which is more efficient to operate and less expensive to manufacture.

According to an aspect of the present disclosure, a method of extracting work from a convertible gas turbine engine having a core flowpath and a bypass flowpath comprises operating the convertible gas turbine engine at a first volumetric flow rate through the core flowpath and a second volumetric flow rate through the bypass flowpath to produce a first work output of the convertible gas turbine engine; extracting the first work output via an unshrouded fan and a shaft at a first fan to shaft extraction ratio; altering the second volumetric flowrate through the bypass flowpath while maintaining the first work output; and extracting the first work output via an unshrouded fan and a shaft at a second fan to shaft extraction ratio.

According to an aspect of the present disclosure, a method of rapidly transitioning between turboshaft and turbofan operations in a convertible gas turbine engine comprising an unshrouded inlet fan and a shaft comprises establishing airflow through a set of fixed inlet guide vanes to an engine core flowpath to achieve maximum operating efficiency of the convertible gas turbine engine; and transferring power between the unshrouded inlet fan and the shaft while maintaining a constant power output of the convertible gas turbine engine by altering the alignment of a plurality of variable inlet guide vanes forward of a bypass flowpath.

According to an aspect of the present disclosure, a method of transferring power in a convertible gas turbine engine having a core flowpath through an air inlet, an unshrouded fan, a compressor, a combustor, and a turbine and a bypass flowpath through the air inlet and the unshrouded fan comprises the steps of admitting a first volumetric flow rate of air into the core flowpath via a first portion of the air inlet comprising a plurality of fixed vanes, the first volumetric flow rate of air optimized for maximum power output of the convertible gas turbine engine; admitting a second volumetric flow rate of air into the bypass flowpath via a second portion of the air inlet comprising a plurality of variable vanes; and adjusting the incident angle of the plurality of variable vanes to alter the second volumetric flow rate of air admitted into the bypass flowpath while maintaining the first volumetric flow rate of air admitted into the core flowpath constant.

Although examples are illustrated and described herein, embodiments are nevertheless not limited to the details shown, since various modifications and structural changes may be made therein by those of ordinary skill within the scope and range of equivalents of the claims.

What is claimed is:

1. A method of extracting work from a convertible gas turbine engine having a core flowpath and a bypass flowpath, the method comprising:
    operating said convertible gas turbine engine at a first volumetric flow rate through said core flowpath and a second volumetric flow rate through said bypass flowpath to produce a first work output of said convertible gas turbine engine;
    extracting said first work output via an unshrouded fan and a shaft at a first fan to shaft extraction ratio;
    altering said second volumetric flowrate through said bypass flowpath while maintaining said first work output; and
    extracting said first work output via the unshrouded fan and the shaft at a second fan to shaft extraction ratio,
    wherein the convertible gas turbine engine further includes a plurality of fan inlet guide vanes, said plurality of fan inlet guide vanes are radially split, having a variable radially-inward portion aligned with said core flowpath and a variable radially-outward portion aligned with said bypass flowpath, and the variable radially-outward portion is axially aligned with and anchored to the variable radially-inward portion.

2. The method of claim 1 wherein said convertible gas turbine engine is affixed to an aircraft.

3. The method of claim 1 wherein said shaft is selectably coupled to a power transfer shaft via a clutch.

4. The method of claim 1 wherein the step of altering said second volumetric flowrate is accomplished by adjusting the alignment of one or more of the plurality of fan inlet guide vanes.

* * * * *